United States Patent [19]

Roland, Sr. et al.

[11] Patent Number: 4,994,649
[45] Date of Patent: Feb. 19, 1991

[54] TEMPERATURE ATTENUATOR TO CONTROL HEATING OF THE CONTENTS OF A CONTAINER AND METHOD OF USING THE SAME

[76] Inventors: Paul G. Roland, Sr., 18 Woodridge Cir., West Hartford, Conn. 06107; Paul G. Roland, Jr., 254 Richard St., #4, Newington, Conn. 06111

[21] Appl. No.: 418,035

[22] Filed: Oct. 10, 1989

Related U.S. Application Data

[63] Continuation-in-part of Ser. No. 278,250, Nov. 30, 1988, abandoned.

[51] Int. Cl.$^5$ .................. H05B 3/68; F24C 15/10
[52] U.S. Cl. ................................. 219/433; 219/432
[58] Field of Search .............. 219/433, 432, 430, 429, 219/436, 438, 439, 283; 99/447, 279, 281, 284; 126/211, 212, 214 C, 214 D, 215, 221, 390, 400

[56] References Cited

U.S. PATENT DOCUMENTS

| | | | |
|---|---|---|---|
| 966,579 | 8/1910 | Myers | 126/215 |
| 1,744,460 | 1/1930 | Finnelly | 126/215 |
| 1,748,461 | 2/1930 | Picarelli | 126/215 |
| 3,054,395 | 9/1962 | Torino | 219/430 |
| 3,687,127 | 8/1972 | Mossman | 126/215 |
| 4,406,942 | 9/1983 | LoConti | 219/433 |
| 4,629,866 | 12/1986 | Proctor | 219/432 |
| 4,798,937 | 1/1989 | Guerrero | 219/433 |
| 4,825,046 | 4/1989 | Box | 219/433 |

Primary Examiner—Teresa J. Walberg
Attorney, Agent, or Firm—Victor E. Libert

[57] ABSTRACT

A temperature attenuator (32, 42 or 64) is provided for spacing a container, such as a coffee container (24), from a warming hot plate (14 or 14'). The temperature attenuator has a thermally insulating spacer (34, 66 or 66') which may be secured to the container or to the hot plate by an adhesive (70), by a harness (44) or any other suitable retainer. The spacer (34, 66 or 66') is of closed peripheral configuration, for example, it may be an O-ring or gasket ring, so that heated air is trapped in an enclosed space(s) sealed between the container bottom and the hot plate. Hot spots which otherwise would result from direct contact of the container (24) with the hot plate (14) are thus avoided and beverages such as coffee may be heated for protracted periods without developing an acrid taste. A method of heating the container contents includes spacing the container by means of the spacer about 1/32nd to 1/8th of an inch (about 0.8 to 3.2 mm) from the heating surface (14s) of the hot plate, and maintaining the hot plate at an elevated temperature of from about 200° F. to 450° F. (about 93° C. to 232° C.).

23 Claims, 5 Drawing Sheets

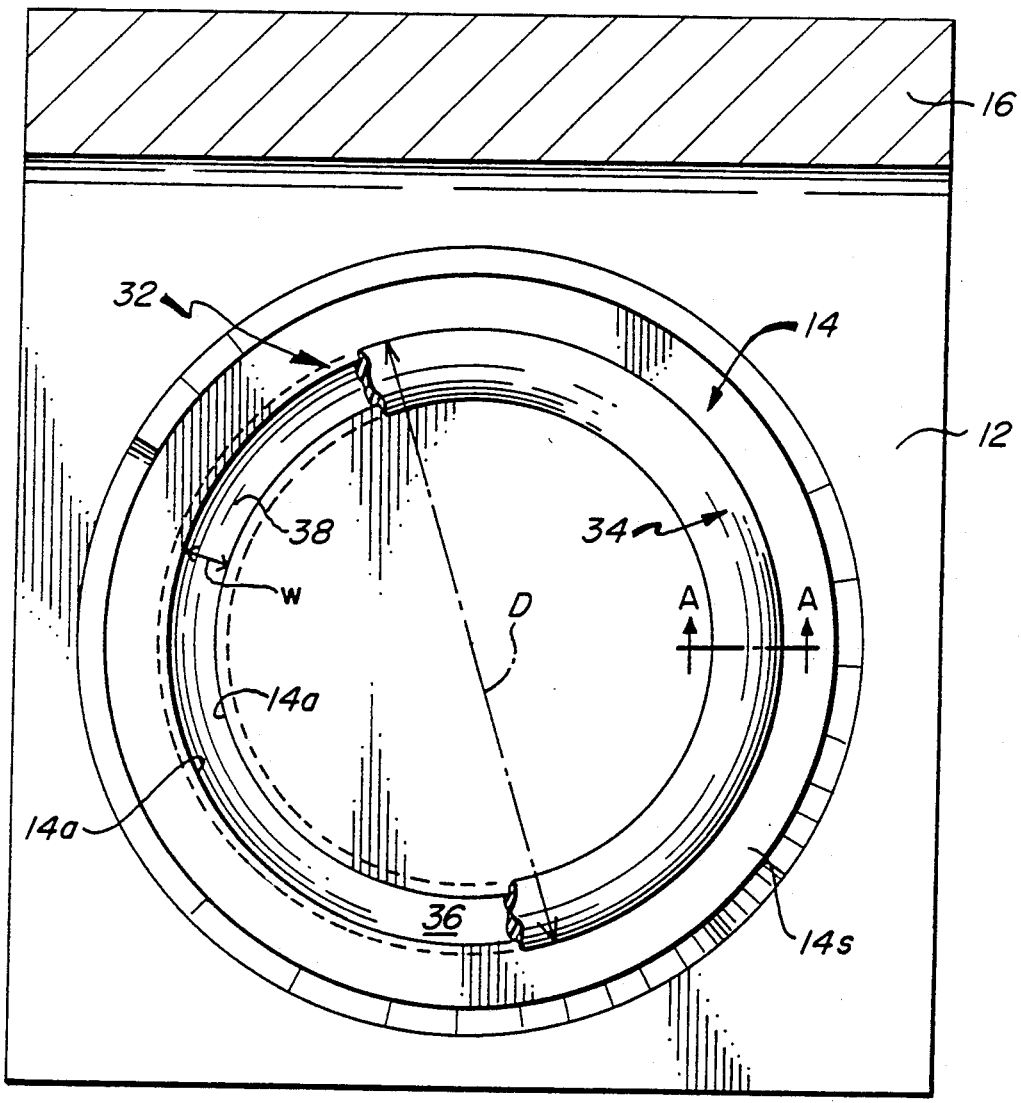
FIG. 3
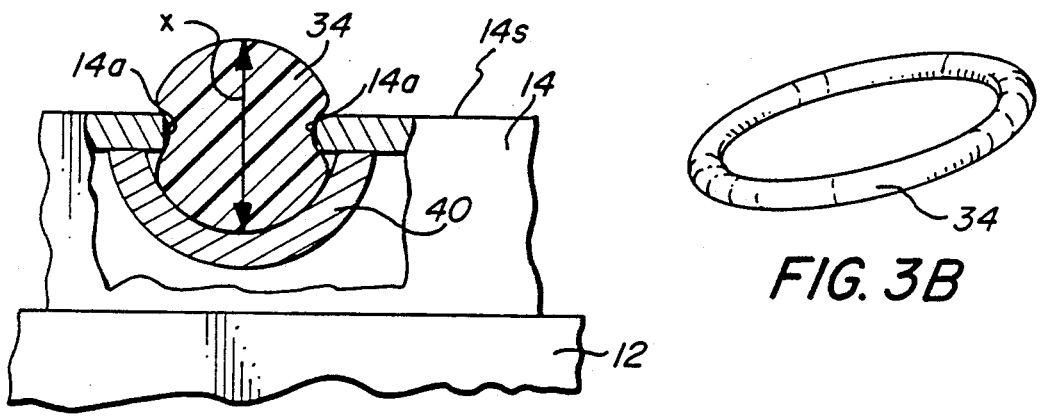
FIG. 3A
FIG. 3B

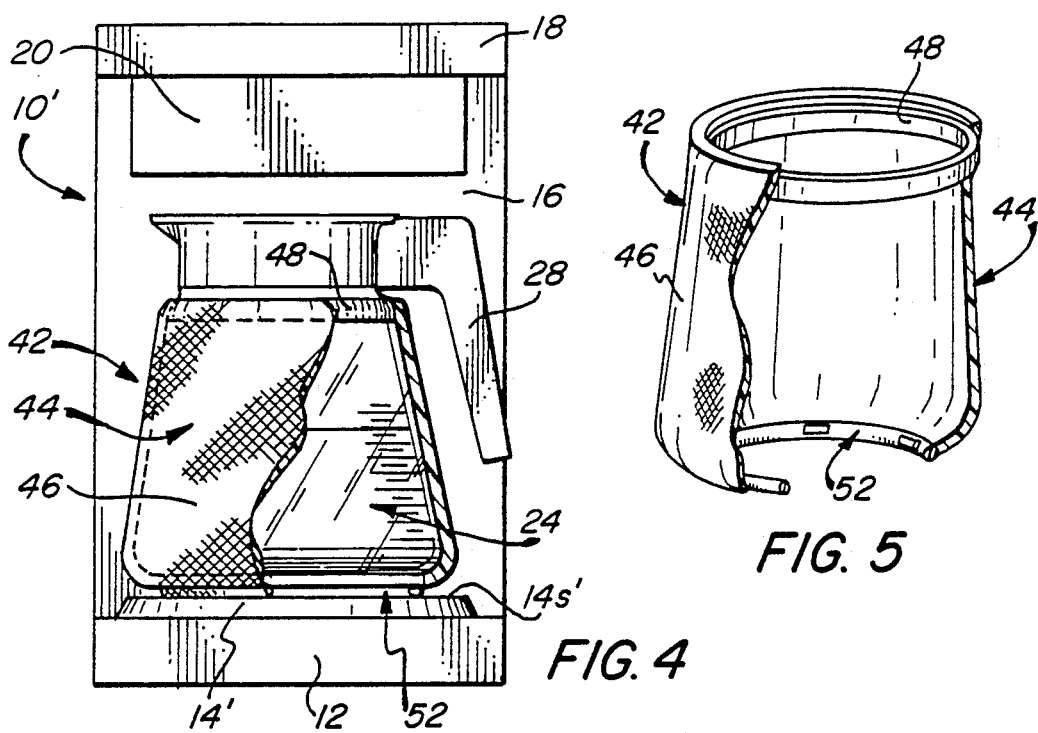
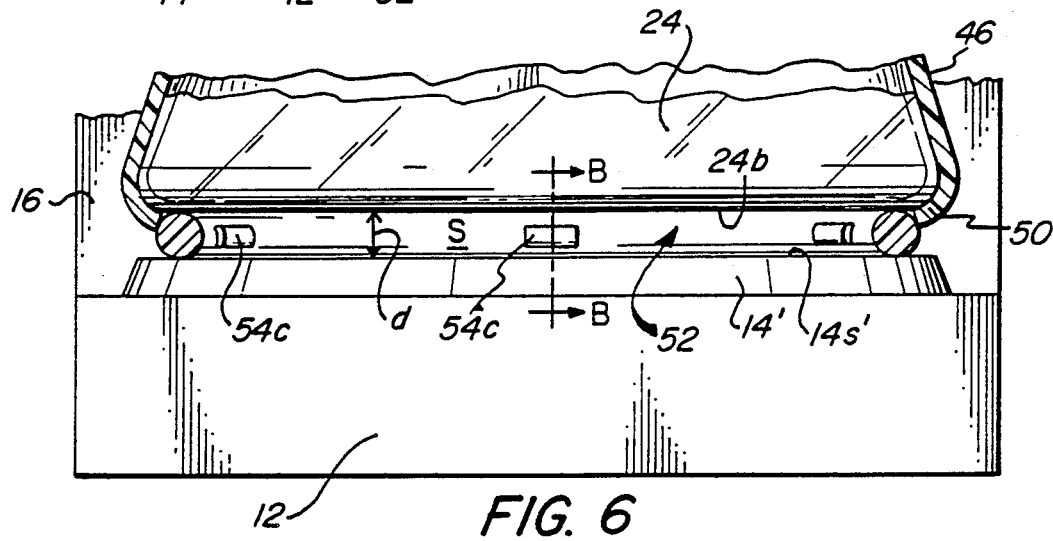
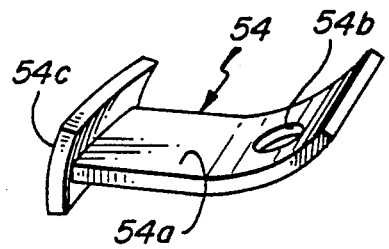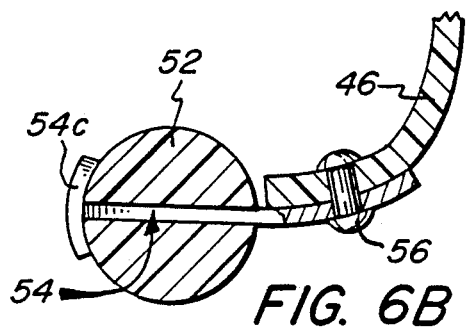

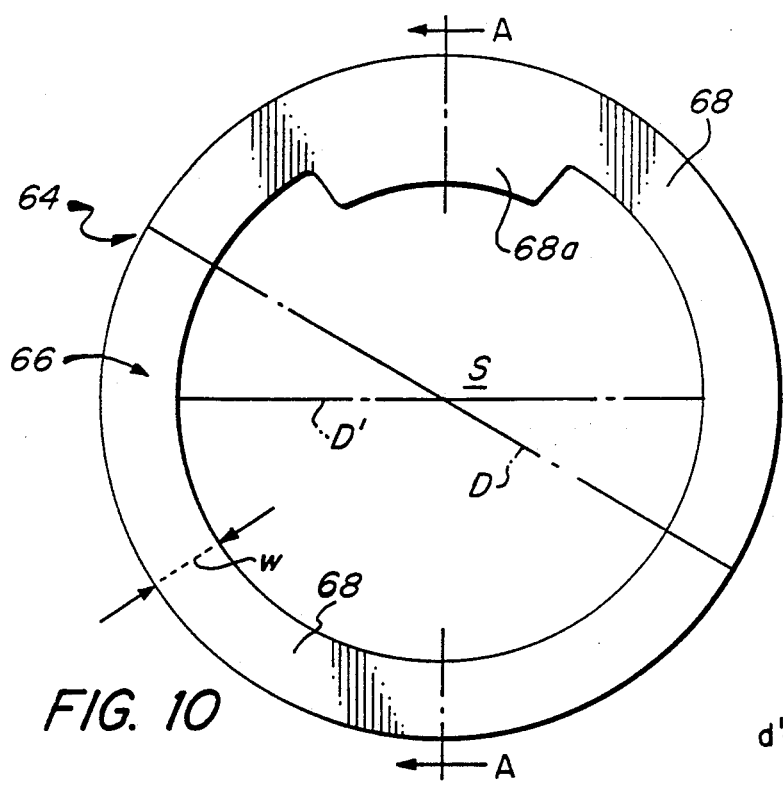
FIG. 10
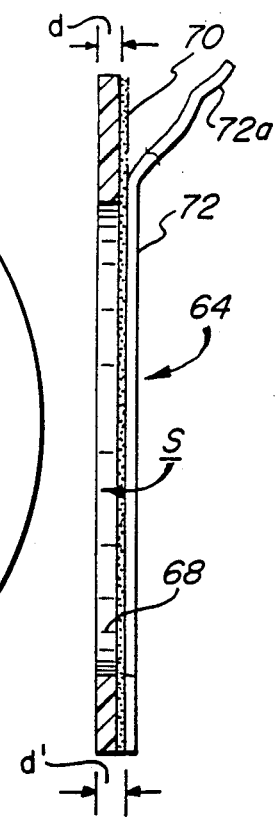
FIG. 10A
FIG. 11A
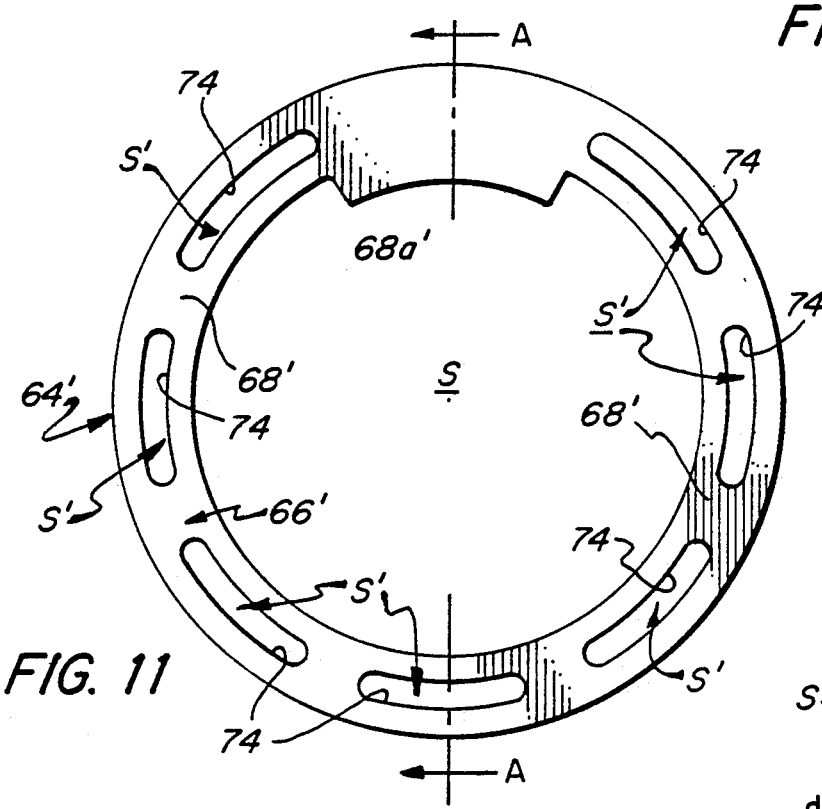
FIG. 11
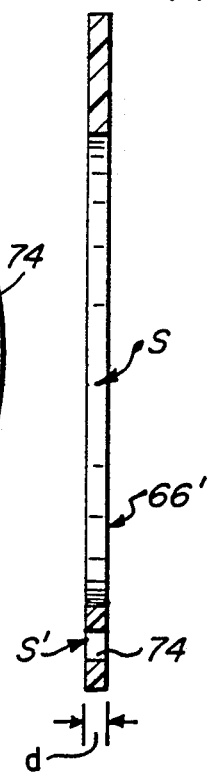

TEMPERATURE ATTENUATOR TO CONTROL HEATING OF THE CONTENTS OF A CONTAINER AND METHOD OF USING THE SAME

BACKGROUND OF THE INVENTION

Cross-Reference To Related Application

This application is a continuation-in-part of co-pending application Ser. No.07/278,250 filed on Nov. 30, 1988 now abandoned in the name of Paul G. Roland, Sr. and Paul G. Roland, Jr. and entitled "Temperature Attenuator to Control Heating of the Contents of a Container and Method of Using the Same".

1. Field Of The Invention

The present invention is concerned with a temperature attenuator for controlling the heating of a container, such as a temperature attenuator used to space a container, such as a beverage container, from a hot plate on which the container is heated. The invention is particularly concerned with a temperature attenuator for a coffee container which is heated on a hot plate to be kept hot for serving at a later time.

2. Related Art

Lo Conti U.S. Pat. No. 4,406,942 discloses a coffee-maker having an electrically heated hotplate and including a stainless steel spacer which is hinge-mounted on the coffeemaker in order that it may be swung between the use position, in which the spacer 10 overlies the hot plate 11, and a storage position as shown in dash-dot line 18 in the sole drawing of the patent. In column 1, the patentee describes the problem of overcooking coffee on the hot plate, and proposes as a solution the provision of the spacer in order to hold the coffeepot spaced a small distance from the hot plate.

Jones U.S. Pat. No. 4,158,125 discloses a pair of arcuate holders 16, 18 (see FIG. 2 and column 3, line 19 et seq.) for a beverage warmer such as a coffee warmer. Spring depressors 34 (FIG. 3) are supported by coil springs 38. As illustrated in FIG. 1, the arcuate holders 16, 18 receive the coffee decanter 15 and hold it above the warming plate, the amount of compression of the coil springs, and consequent spacing of the decanter above the warming plate, being determined by the weight of liquid within the decanter. Column 1, lines 18-59 describes warming evaporation problems and the results attained by the patentee's invention are described at column 4, lines 23-29.

Gurrero U.S. Pat. No. 4,798,937 discloses a cover for the warmer plate of a coffee-brewing apparatus which may be made of a plastic material and has a top surface in which is formed a pattern of grooves or depressions designed to produce uniform heat distribution and a bottom surface which is either flat or conforms to the vessel-retaining flange of the warmer plate.

Finnelly et al U.S. Pat. No. 1,744,460 discloses a kettle support comprising an outer ring 1 connected to a concentric, inner ring 7 by radial arms 8. Outer ring 1 contains a series of vent openings 5 and perforations 6 and inner ring 7 contains a series of perforations 9, all to permit air flow therethrough. (See page 1, lines 54-100.) The kettle base is fashioned "of metal that is an exceptionally good conductor of heat" (page 1, lines 19-24).

Fajans U.S. Pat. No. 4,170,931 discloses a percolator-type coffeemaker spaced from a metal heating plate by a circular spacer disk which is inserted, after the water has been heated almost to the boiling point, under the base of the percolating tube. Consequently, only that portion of the body of water directly under the percolating tube is boiled. At column 3, lines 48-50, Fajans discloses that the spacer arrangement may be used to keep the coffee hot after brewing.

Mossman U.S. Pat. No. 3,678,127 discloses a support ring for a cooking vessel comprising a star-shaped spider spot-welded to an inner ring and an outer ring as illustrated in FIG. 1. The spider is made of a bandsaw-like material having its pointed teeth directed downwardly, in order to reduce the area of contact between the spider and the stove heating element. The rate of heat transfer to the cooking vessel is said to be thereby reduced, to prevent scorching of the food being cooked.

SUMMARY OF THE INVENTION

In accordance with the present invention, there is provided a temperature attenuator for a container having a container bottom which is dimensioned and configured to be seated upon a hot plate for heating the contents of the container, the temperature attenuator comprising a thermally insulative spacer means of closed peripheral configuration, e.g., a non-metallic spacer means, such as a spacer means comprised of a temperature-resistant synthetic organic polymeric material. The spacer means is dimensioned and configured to be interposed between the container bottom and the hot plate to thereby enclose an air space between the container bottom and the surface of the hot plate. Consequently, the support means, when in its interposed position, supports the container bottom in spaced, facing proximity to the hot plate. A retainer means is secured to the spacer means and is dimensioned and configured to retain the spacer means in its interposed position.

In accordance with certain aspects of the present invention, the retainer means secures the spacer means in its interposed position by permanently or removably connecting the spacer means to either the container bottom or the hot plate.

In accordance with another aspect of the invention, there is provided a temperature attenuator for a container having a container bottom which is dimensioned and configured to be seated upon a hot plate for heating the contents of the container. The temperature attentuator comprises a thermally insulating spacer means, such as a gasket ring made of a heat-resistant, synthetic polymeric material the spacer means comprising a support band of closed peripheral configuration having one or more closed-periphery openings formed therein. The spacer means is dimensioned and configured to be interposed between the container bottom and the hot plate to enclose a plurality of air spaces between the container bottom and the surface of the hot plate, whereby the support means, when in its interposed position, supports the container bottom in spaced, facing proximity to the hot plate.

In one aspect of the invention, the spacer means is of annular configuration, e.g., the spacer means may comprise an O-ring or a gasket ring made of a heat-resistant, synthetic polymeric material. In yet another aspect of the present invention, the retainer means may comprise a heat-resistant adhesive applied to the spacer means, for example, the spacer means has a container side and a hot plate side and the adhesive retainer means is applied to one, but not both, of the container and hot plate sides of the spacer means.

In accordance with another aspect of the present invention there is provided a method of heating beverage contents, for example, coffee, of a container having a container bottom dimensioned and configured to be seated upon a hot plate having a heating surface. The method comprises the steps of (a) supporting the container with its container bottom in close facing proximity to the heating surface of the hot plate by interposing a thermally insulative support means of closed peripheral configuration between the container bottom and the hot plate to thereby enclose one or more air spaces between the container bottom and the heating surface of the hot plate, and, (b) maintaining the hot plate at an elevated temperature to heat the contents of the container.

In one aspect of the invention, the spacer means is dimensioned and configured to support the container bottom from about 1/32nd to about ⅛th of an inch, which is equivalent to about 0.8 to 3.2 millimeters ("mm"), preferably from about 1/32nd to about 1/16th of an inch, (about 0.8 to 1.6 mm), from the heating surface of the hot plate.

Yet another aspect of the invention includes maintaining the hot plate at a temperature of from about 200° F. to about 450° F. (about 93° to 232° C.), preferably from about 300° F. to about 400° F. (about 149° C. to 204° C.), for heating coffee in the container.

As used herein and in the claims, the following terms shall have the indicated meanings.

The description of an item as being of "closed peripheral configuration" means an item such as a ring or closed loop which has a central opening defined by a continuous peripheral structure, e.g., a gasket ring or a conventional O-ring. Similarly, the term "closed-periphery" used to describe openings formed in the annular band of the spacer means means that the opening is surrounded about its entire periphery by the material of the support band.

The description of supporting the container bottom "in close facing proximity" to the heating surface of the hot plate means that the container bottom and the heating surface are directly exposed to each other, as opposed to being completely or substantially completely separated from one another by a continuous pad or the like separating them.

The term "heat-resistant" is used to characterize a material which can sustain, in the use to which it is put, temperatures of up to at least 400° F. (about 149° C.), preferably up to about 500° F. (about 232° C.).

The term "thermally insulating" used with reference to the spacer means that it displays a thermal conductivity significantly less than that of a metal, and comparable to that of elastomeric materials such as silicone rubbers or of fluorocarbon synthetic organic polymeric materials, which are free of metal or other heat conductors comparable to metal.

BRIEF DESCRIPTION OF THE DRAWINGS

FIG. 3 is a plan view, with parts broken away, of the base portion of the coffeemaker of FIGS. 1 and 2;

FIG. 3A is a section view taken along line A—A of FIG. 3, and on an enlarged scale with respect to FIG. 3;

FIG. 3B is a perspective view of the spacer means component of the temperature attenuator of FIG. 3;

FIG. 4 is a schematic front view in elevation of a drip-type coffeemaker having a hot plate on which a container equipped with another embodiment of the temperature attenuator of the present invention is supported;

FIG. 5 is a perspective view with parts broken away showing the temperature attenuator of FIG. 4 removed from the container;

FIG. 6 is a partial front view in elevation, on a scale enlarged with respect to FIG. 4, of the base portion of the coffeemaker of FIG. 4 showing the container seated on the support means;

FIG. 6A is a perspective view on an enlarged scale of one of a plurality of fastener means used in the embodiment of the invention illustrated in FIG. 6;

FIG. 6B is a cross-sectional view, taken along line B—B of FIG. 6, and on a scale enlarged with respect to FIG. 6, of the temperature attenuator of FIG. 6;

FIG. 10 is a plan view of a temperature attenuator comprising a spacer means in accordance with another embodiment of the present invention;

FIG. 10A is a section view taken along line A—A of FIG. 10;

FIG. 11 is a plan view of a temperature attenuator comprising a spacer means in accordance with yet another embodiment of the present invention; and FIG. 11A is a section view taken along line A—A of FIG. 11.

DETAILED DESCRIPTION OF THE DRAWINGS AND PREFERRED EMBODIMENTS OF THE INVENTION

Figure 1:
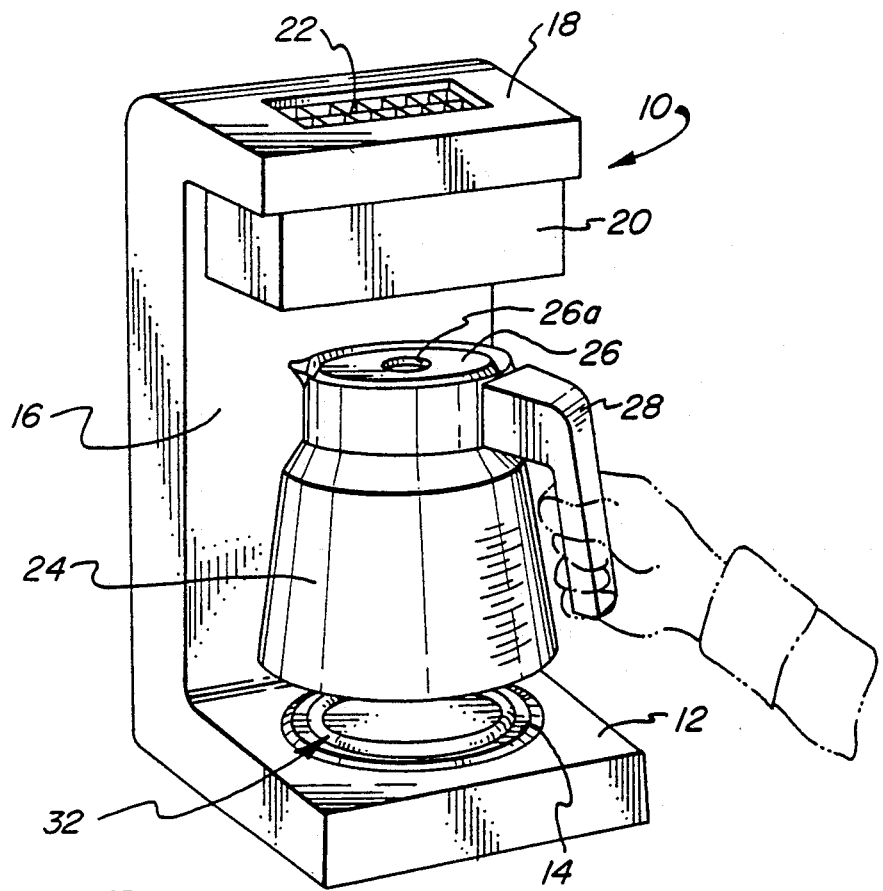
FIG. 1 is a schematic perspective view of a drip-type coffeemaker having a hot plate which is equipped with a temperature attenuator in accordance with one embodiment of the present invention, and showing a coffee container held above the hot plate.

Referring now to FIG. 1, there is shown schematically at 10 a drip-type coffeemaker having a base 12 within which is mounted a hot plate 14. As is conventional in the construction of such coffeemakers, a stanchion support 16 has an overhead portion 18 on which is carried a removable filter housing 20, within which a filter and ground coffee is placed. Filter housing 20 is then inserted into a suitable spacer means (not shown) formed on the underside of overhead portion 18 and a pre-measured quantity of water is introduced through fill opening 22. Coffeemaker 10 is equipped with a power cord (not shown) and the water, when heated to brewing temperature, is passed through the ground coffee and discharged into a suitable container 24 through a top opening 26a formed in a cover 26 thereof. Container 24 has the usual handle 28. A hot plate 14 comprising a disc-shaped metal plate is heated from beneath by a suitable heating coil in the known manner. Except for the provision of a temperature attenuator 32 as described below, the construction of coffeemaker 10 is, of course, conventional and well known, the hot plate serving to keep the coffee hot while awaiting use.

It is a common experience that coffee, when left too long on a hot plate, will develop an acrid, unpleasant taste and, if heated long enough, the coffee may evaporate entirely, leaving a scorched residue at the bottom of the container. The problems of a warming hot plate overcooking, and even evaporating, coffee and the consequent limitation on the time the coffee may be kept on the hot plate while awaiting serving, is recognized in the art. The art also shows the use of conventional grids or the like mounted on the coffeemaker means to space the container from the hot plate in order to overcome the problem. For example, see the above-mentioned Lo Conti U.S. Pat. No. 4,406,942, at column 1, lines 17–27.

Figure 2:
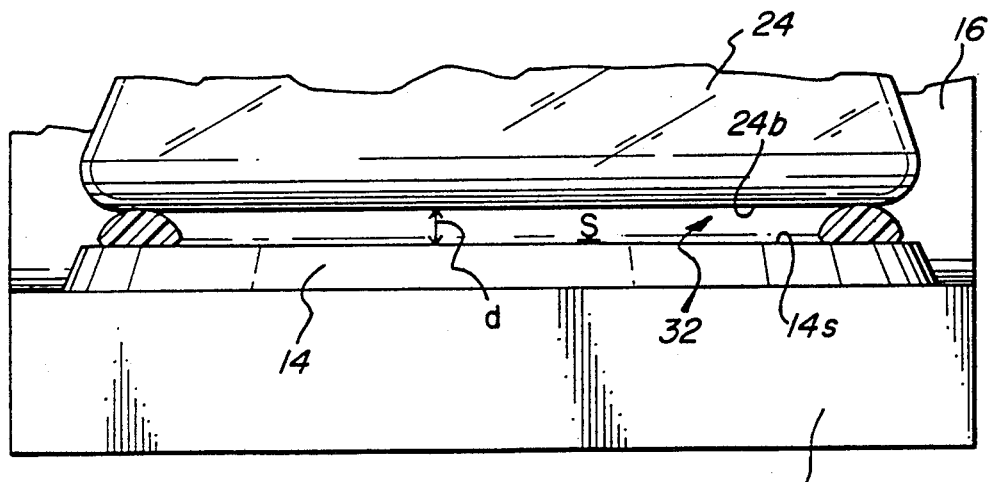
FIG. 2 is partial front view in elevation, on a scale enlarged with respect to FIG. 1, of the base portion of the coffeemaker of FIG. 1 showing the container sealed upon the temperature attenuator.

In the embodiment of the invention illustrated in FIGS. 1–3A, a temperature attenuator 32 comprises an annular spacer means 34 which, as in the illustrated embodiment, may be an O-ring, and retainer means 36 which secures spacer means 34 to hot plate 14. (Any suitable shape of spacer means may be employed, for example, a gasket-like spacer means as illustrated in FIGS. 10 and 11 and described in detail below.) In the embodiment illustrated in FIGS. 1–3A, retainer means 36 comprises a circular-shaped slot 38 formed in the surface of hot plate 14, shoulder portions 14a and circular ring 40. As best seen in FIG. 6A, a circular ring 40 of hollow, hemispherical cross section may be welded or otherwise affixed beneath circular-shaped slot 38. The concave mouth or opening of ring 36 is slightly larger than the width w (FIG. 3) of slot 38 so that, as best seen in FIG. 3A, shoulder portions 14a of slot 38 project into the opening provided by circular ring 40. With this construction, and with spacer means 34 formed of an elastomeric or other resilient material, support ring 34 can be force-fit into the opening provided by circular-shaped slot 38. Spacer means 34 is thus positioned with a portion thereof projecting upwardly above the top surface 14s of hot plate 14. As best seen in FIG. 2, spacer means 34 is of a diameter so that the portion thereof which projects above top surface 14s of hot plate 14 provides a desired distance d by which the bottom 24b of container 24 is spaced from top surface 14s.

Generally, for warming coffee on hot plates usually supplied as part of drip-type coffeemakers, the dimension d should be from about 1/32nd to ⅛th of an inch (about 0.8 to 3.2 mm), preferably from about 1/32nd to 1/16th of an inch (about 0.8 to 1.6 mm). It has been found that if the dimension d is substantially less than about 1/32nd of an inch, hot spots may occur causing local overheating of the coffee, possibly due to irregularities in the container bottom and/or the heating surface of the hot plate. On the other hand, if the dimension d is substantially greater than about ⅛th of an inch, the coffee is not maintained at a sufficiently high temperature, which desirably should be on the order of about 160° F. to 190° F. (about 71° C. to 88° C.) depending on individual taste. A distance for the dimension d of not more than about 1/16th of an inch is generally preferred as keeping the coffee or other beverage warmer. In embodiments such as those illustrated in FIGS. 6, 8 and 9, the cross-sectional diameter of the spacer means (e.g., dimension x in FIG. 3A) is selected to be substantially equal to the dimension d, as described above. In embodiments such as that illustrated in FIG. 2, wherein a portion of the cross-sectional depth of the spacer means is recessed beneath the hot plate surface, the cross-sectional dimension x will, of course, be correspondingly larger to give the desired spacing. In the embodiment illustrated in FIG. 3A about one-half the diameter of the spacer ring is recessed and so the cross-sectional dimension x is about twice that of the dimension d.

The elastomeric construction of spacer means 32 enables it to yield somewhat under the weight of container 24 and the coffee or other beverage or liquid contained therein, so that an effective air seal is formed between annular spacer means 32 and the bottom 24b of container 24. This results in a tight air seal about sealed space S (FIG. 2) formed between hot plate 14 and container 24, more specifically, between heating surface 14s and container bottom 24b. Heated air is trapped within sealed space S while container 24 remains in place. It has been found that the closed peripheral construction of spacer means 32 and the resultant enclosed space S maintains the air entrapped within space S at a high temperature and provides good heating of the coffee contained within container 24 without the creation of hot spots or excessive heating.

Spacer means 34 is shown in perspective view in FIG. 3B and may comprise an ordinary O-ring of suitable outside diameter D (FIG. 3) and cross sectional diameter x (FIG. 3A). Generally, the outside diameter D of the support means should be only slightly less than the diameter of the container bottom 24b, in order to maximize the area of container bottom 24b which is exposed to enclosed space S. Therefore, the outside diameter of the support means is usually selected to be from about 50% to 100%, preferably from about 65% to 98%, of the diameter of the container bottom. Generally, the spacer means (e.g., the O-ring) is placed or retained in a position which is substantially concentric with the container bottom and/or the heating surface of the hot plate.

The utilization of standard, circular cross section O-rings as the spacer means is economical because these are off-the-shelf, commercially available items. The O-ring spacer means has a very large central opening in relation to the width of its annular support band, and this construction of the closed-loop spacer means exposes most of the surface area of the container bottom directly to the heating surface. For example, the spacer means may comprise an O-ring of from about 3 inches to 5 inches outside diameter, which is equivalent to about 7.6 to 12.7 centimeters ("cm"), and having a circular cross section of the annular support band of from about 1/32nd of an inch to about ⅛th of an inch (about 0.8 to 3.2 mm) in diameter. The spacer means in such case has a central opening of a diameter of about 2¾ inches (about 7.0 cm) to about 4 15/16 inches (about 12.5 cm) and an annular support band of an effective width identical to the cross section diameter. Generally, the ratio of the diameter of the central opening enclosed by the annular support band to the width of the annular support band is from about 80:1 to about 10:1. Gasket ring-type spacer means as illustrated in FIGS. 10 and 11, are seen to have flat annular support bands which are wide and thin, whereas the O-ring type spacer means have small diameter peripheral bands which are circular in cross section.

Whether of the O-ring or gasket ring type, the resultant provision of a large, sealed opening between the container bottom and the heating surface by the support means of the invention provides both radiant and conduction (through the sealed air) heating, and results in more even higher temperature heating of the container than would be attained if a solid, thermally insulating pad were placed between the container bottom and the heating surface of the hot plate.

Generally, the elastomeric or other synthetic organic polymeric material from which spacer means such as O-rings or gasket rings are constructed endows them with sufficient thermal insulation properties to be useful in the practices of the present invention. For example, the utilization of metal grids or other highly heat-conducting support means resting on the hot plate has been found to conduct excessive heat to the coffee contained within the container, thereby providing undesirably high local temperatures in the coffee. It is an aspect of the present invention that a thermal insulating material is employed and it has been found that elastomers, such as fluorocarbon elastomers such as those sold under the trademark VITON°, provide a sufficient degree of thermal insulation to avoid the creation of hot spots under the conditions of use. Other suitable materials may be employed. For example, the spacer means may be made of a silicone rubber, such as those available from Bisco Products of Elk Grove, Ill. and sold under the designations HT-1240, HT-1250, HT-1330 and HT-1350. The last two digits of the designating numbers, e.g., 30, 40 or 50, indicate the durometer hardness of these silicone rubbers. The 1200 series materials are rated for use at temperatures up to about 450° F. (about 232° C.) and the 1300 series materials for temperatures up to about 500° F. (about 260° C). These materials are sufficiently soft to provide a good, substantially air-tight seal between the surface of the hot plate and the bottom surface of a container placed thereupon.

The conditions of use of the devices of the present invention include using a spacer means of a thickness of from about 1/32nd to ⅛th inch (about 0.8 to 3.2 mm) to space container bottoms from the surfaces of hot plates operating in a usual temperature range of from about 200° to 450° F. (about 93° C. to 232° C.) more usually, about 300° to 400° F. (about 149° C. to 204° C.).

The spacer means 34 may also comprise an O-ring of customized construction having peripheral grooves formed therein on both the outer and inner peripheries thereof in order to receive shoulders 14a. Similarly, the spacer means may be of non-circular, closed peripheral configuration, enclosing a space S (as illustrated in FIGS. 2 and 6) beneath the container bottom. Generally, a circular closed peripheral configuration, i.e., a circular closed loop, is the most convenient shape.

Generally, the spacer means may be made of any suitable material of relatively low thermal conductivity, i.e., a non-metal, and a suitably soft material, such as an elastomeric material, is preferred to facilitate sealing the enclosed air space (S in the drawings). Fluorocarbon elastomers and silicone rubbers have been found to be satisfactory for purposes of the present invention. Thus, O-rings or gasket rings comprised of fluorocarbon materials sold under the trademarks VITON ®, FLUOREL ® or FKM ® provide excellent performance as do silicone rubbers. The fluorocarbon materials are resistant to temperatures as high as 437° F. (225° C.) and, like the silicone rubbers, provide excellent chemical resistance to coffee, other beverages and foods, good heat resistance and good mechanical properties, including compression set resistance. The fluorocarbon elastomers and silicone rubbers also have a desired relatively low thermal conductivity so that most of the heating of the container is by radiant heat from the hot plate and by the heated air entrapped within the sealed space S, with relatively little heating of the coffee by conduction through the spacer means 34. The O-rings or gasket rings may be made of any other suitable materials, especially materials such as silicone elastomers, fluorosilicones, or nitrile (buna N).

Referring now to FIG. 4, there is illustrated in another embodiment of the invention mounted on a container which is used in conjunction with a conventional drip-type coffeemaker. The coffeemaker 10' of FIG. 4 is identical to that illustrated in FIG. 1, except that it lacks the built-in temperature attenuator 32 and has a conventional hot plate 14', so that coffeemaker 10' is of conventional construction. Corresponding parts of coffeemaker 10' are identically numbered to those of the coffeemaker 10 of FIG. 1, except for the addition of prime indicators to the indicia numerals associated with the hot plate and its heating surface, indicated respectively by 14' and 14s'. The container 24 may be identical to container 24 of the FIG. 1 embodiment.

In this embodiment, the temperature attenuator 42 (FIGS. 4 and 5) is removably mounted directly upon the container 24 and may comprise (FIG. 5) a harness 44 to which a spacer means 52 (FIGS. 4, 5 and 6) is attached by a plurality of fasteners 54 (FIG. 6A). Harness 44 comprises a thermal insulating cover 46 having an upper elastic band 48 and a lower edge 50. A spacer means 52, comprising an O-ring in the illustrated embodiment, is secured to lower edge 50 of cover 46 by a plurality of the fasteners 54.

As seen in FIG. 6A, fasteners 54 comprise a tongue portion 54a which is curved slightly at its distal end and therein has an aperture 54b. The opposite end of tongue portion 54a terminates in a curved head portion 54c. Fastener 54 is, as best seen in FIG. 6B, inserted through slots formed or punched in spacer means 52 and secured to the lower edge 50 of thermal insulating cover 46 by suitable fasteners such as rivet fastener 56. In this embodiment, the entire surface of spacer means 52 may bear upon, respectively, the top surface 14s' of hot plate 14' and the container bottom 24b of container 24. Harness 44 and thermal insulating cover 46 thereof are preferably of elasticized construction, so that harness 44 can be readily emplaced upon and removed from container 24 and, when in place, will snuggly fit about container 24. Harness 44 is dimensioned and configured so that when temperature attenuator 42 is applied about container 24, thermal insulating cover 46 substantially encloses container 24 to reduce radiant heat losses therefrom, and spacer means 52 is positioned adjacent the bottom 24b of container 24, as shown in FIGS. 4 and 6.

Figure 7A:
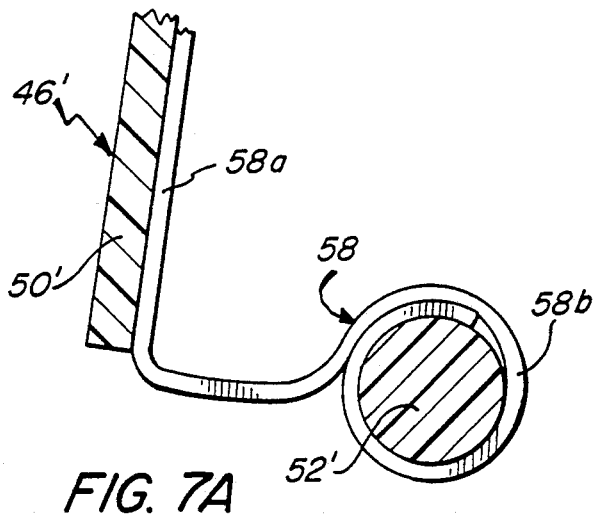
FIG. 7A is a partial section view corresponding to that of FIG. 6A, but of a different embodiment of a fastener means used for the same purpose as that of FIG. 6A.
Figure 7B:
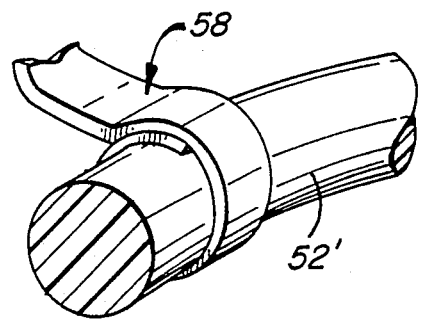
FIG. 7B is a partial perspective view showing a segment of a spacer means with the fastener means of FIG. 7A attached thereto.
Figure 8:
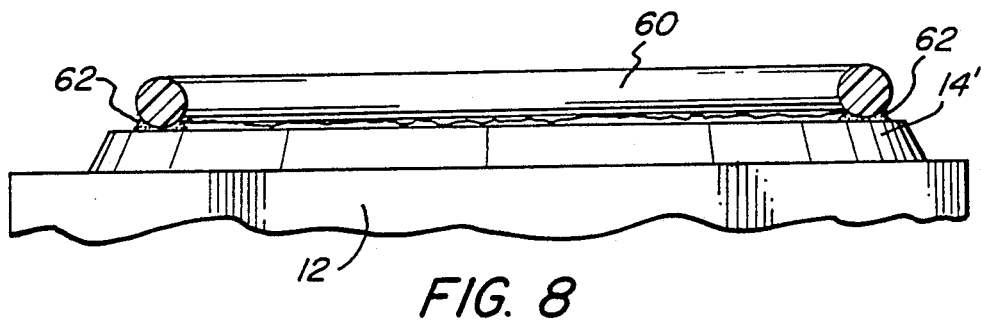
FIG. 8 is a partial front view in section of a temperature attenuator in accordance with one embodiment of the invention, comprising a spacer means secured to a hot plate by an adhesive.

FIGS. 7A and 7B show an alternate arrangement for connecting a spacer means 52' to the lower edge 50' of a thermal insulating cover 46'. In this embodiment, fastener straps 58 are wrapped around spacer means 52' so that it is not necessary to form or cut slots in support means 52'. A length 58a of fastener straps 54 is secured to lower edge 50' of thermal insulating cover 46 by any suitable means, such as mechanical fasteners or by sewing. The distal portions 58b of fastener straps 58 are wrapped about spacer means 52 and may be secured thereto by any suitable means such as a mechanical fastener, e.g., a snap-grip fastener, or by use of a hook and loop fabric fasteners, such as VELCRO ® fasteners. Thus, a VELCRO ® fastener may be secured to at least the distal end of fastener strap 58, or the entirety of fastener strap 58 may be comprised of a VELCRO ® fastener, one side comprising hooks and the other loops, so that fastener strap 58 will attach to itself as illustrated in FIG. 7A. Referring now to FIG. 8, there is shown yet another embodiment of the invention wherein a spacer means 60 comprising an O-ring made of an elastomeric material, preferably a fluorocarbon material such as a VITON TM fluorocarbon, is secured to a hot plate 14' by means of an adhesive 62, which may be any suitable temperature-resistant adhesive. Silicone adhesives and acetepoxy adhesives have been found to be particularly useful for adhering elastomeric O-rings to metal hot plates.

Figure 9:
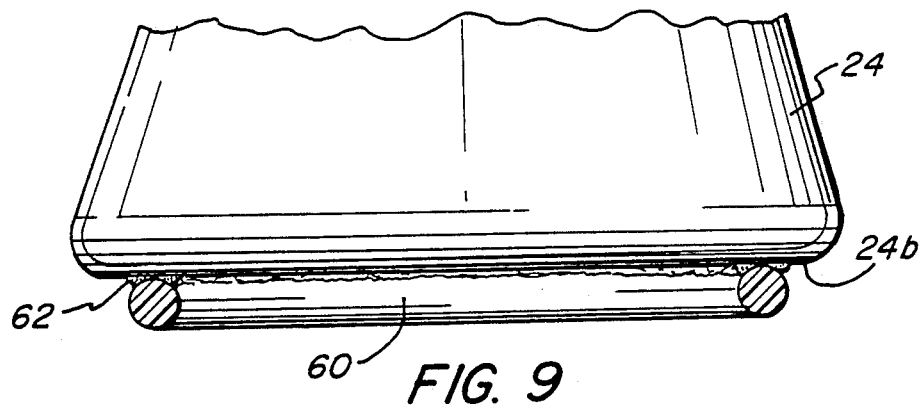
FIG. 9 is a partial front view in elevation of a temperature attenuator in accordance with another embodiment of the invention secured to a container bottom by adhesive.

FIG. 9 shows yet another embodiment of the invention wherein a similar or identical spacer means 16 is adhered to container bottom 24b of container 24 by the same or similar adhesive 62. The silicone and acetepoxy adhesives have also been found useful in adhering the fluorocarbon polymer O-rings to the container bottoms of glass beverage containers such as glass coffee containers. In one embodiment, the container bottom may have a circular recess formed therein, into which the spacer means is received. It will be appreciated that the spacer means has what may be termed a "container side", which faces the container, and a "hot plate side", which faces the hot plate, depending on the orientation of the spacer means when the temperature attenuator is in its interposed position between the container and the hot plate. The container side of the spacer means may be affixed to the container bottom or the hot plate side may be affixed to the hot plate.

EXAMPLE 1

A series of tests was conducted employing as the temperature attenuator an O-ring as illustrated in FIG. 3B. For purposes of the test, the O-ring was placed upon the hot plate of a number of conventional automatic drip coffeemakers, each of which included a glass coffee container having a removable cover supplied by the manufacturer. The O-rings used were made of VITON ® fluorocarbon elastomer supplied by National O-Ring Company and measuring 3½ inches in outside diameter and 3 ¼ inches in inside diameter. The cross-sections of the O-rings were circular, with a cross-sectional diameter of ⅛th of an inch. Tests were conducted with four commercially available home-use models of automatic drip coffeemaker s. These were Norelco, GE, Mister Coffee and Braun home coffeemakers. A total of over 100 tests were run, with the following average results.

In each case, six cups of coffee were brewed and allowed to run into the glass beverage container provided by the manufacturer as part of the coffeemaker, in the usual manner. When the spacer means was employed, it was placed directly upon the hot plate, using no adhesive or other retainer means, and the coffee container was placed directly upon the O-ring spacer means. Temperatures were measured and the brewed coffee tasted and smelled for the development of an acrid or "burnt" odor and taste. Tests were conducted both with the coffee container cover in place and removed, and with and without the O-ring spacer means being utilized. In all cases, the temperature of the freshly brewed coffee discharged into the container from the coffeemaker was about 190° and promptly cooled to an average temperature of about 175° F. No coffee was removed from the container during the test except for very small samples for tasting. The following results were attained.

| O-Ring Spacer Means In Use | Container Cover | Average Time To Development Of Acrid Taste | Temperature Range of Coffee |
| --- | --- | --- | --- |
| No | In place | 35 minutes | 175–182° F. |
| No | Removed | 25 minutes | 167–172° F. |
| Yes | In place | 3 hours | 175–185° F. |
| Yes | Removed | 2½ hours | 157–163° F. |

Example 2

Further tests were conducted on a one-burner Bunn-O-Matic commercial unit manufactured by Bunn Corporation, using the same spacer means as was used in Example 1. This is a commercial coffeemaker used in restaurants. The O-ring spacer means was placed on the hot plate of the unit, and 10 cups of freshly brewed coffee were discharged from the unit into the glass container supplied with the unit by the manufacturer. The temperature of the freshly brewed discharged coffee was about 190° F. and promptly cooled to an average temperature of about 175° F. on the hot plate. The 10 cups of coffee were maintained on the hot plate for up to six hours before development of an unacceptable acrid taste was noted. With the cover left in place, the temperature of the coffee after six hours was about 185° F.

The above examples demonstrate that by utilizing the temperature attenuator of the present invention, more uniform distribution of the heat to the beverage container and the avoidance of hot spots causing localized increases in temperature is avoided. This prevents or retards chemical reactions which occur at elevated temperature and result in deterioration of the beverage, especially in the development of an acrid taste in coffee.

Referring now to FIG. 10, there is illustrated yet another embodiment of the present invention. In this embodiment (as in the embodiment of FIG. 11, described below) the temperature attenuator of the invention comprises a spacer means which has the general overall configuration of a gasket ring. That is, the spacer means has a generally ring or annular shape cut from a material which is thin relative to the width ("W" in FIG. 10) of the annular support band forming the ring. The thickness of temperature attenuator 64 is indicated at d in FIG. 10A. For example, the material of which temperature attenuator 64 is made may be a silicone rubber of about 1/32 to 1/16 of an inch or so (about 0.8 to 1.6 mm) in thickness. The material may be any suitable thermally insulating material such as any suitable synthetic organic polymeric material, for example, a silicone rubber or a fluorocarbon material as described above. FIG. 10 shows a temperature attenuator 64 comprising an annular-shaped spacer means 66 which generally has the shape a gasket ring, being comprised of a generally annular-shaped support band 68 of a flat material (as best seen in FIG. 10A) which is thin compared to the width W of support band 68. In the illustrative embodiment, spacer means 66 has an inwardly projecting tab 68a integrally formed therewith. Tab 68a serves to provide a radially enlarged portion of support band 68 on which instructions for use or care of the temperature attenuator or other indicia, such as a trademark, may be embossed or otherwise applied. The closed peripheral configuration of support band 68 and, therefore, of spacer means 66 generally, serves to provide an enclosed space S between the surface of the heating plate and the container bottom (not shown in FIG. 10) in the same manner as described above with respect to the embodiment of FIGS. 2 and 6.

A retainer means may be provided for the temperature attenuator 64 in the form of, for example, an adhesive layer 0 (shown in FIG. 10A in greatly exaggerated thickness, for improved clarity of illustration). Adhesive layer 70 may be a pressure-sensitive adhesive such as a silicone adhesive of the type sold under the trademark Donsil 20 78K by Flexcon Company, Inc. of Spencer, Massachusetts. The adhesive is conveniently covered by a suitable peelable release liner 72 (FIG. 10A) which is of substantially identical shape to temperature attenuator 64, so as to overlie adhesive 70 during shipment and storage. Release liner 72 is usually a siliconized kraft or a polyester material. When temperature attenuator 64 is ready for use, release liner 72 may be removed therefrom and temperature attenuator 64 adhered to either the surface of the hot plate or the bottom of the container, as described above. Release liner 72 may be formed with one or more extension tabs 72a (FIG. 10A) which project beyond temperature attenuator 64 to facilitate removal of release liner 72 therefrom. Adhesive layer 70 may simply be a coating of adhesive applied to one side of spacer means 66. Alternatively, adhesive layer 70 may be provided by a sheet of adhesive material such as a silicone adhesive sheet so that spacer means 66 is of layered construction, comprising one layer of a suitable thermal insulating material and a second layer of a silicone adhesive sheet material or the like. In one embodiment, an adhesive sheet material of about 1 to 3 mils in thickness is applied to a silicone rubber material of about 1/32nd of an inch thickness. In FIG. 10A, the dimension d' indicates the combined thickness of annular support band 68 plus adhesive 70.

FIG. 11 illustrates yet another embodiment of the invention in which a temperature attenuator is of generally similar or identical shape and size as attenuator 64 of the FIG. 10 embodiment. However, in the embodiment illustrated in FIG. 11, the spacer means 66' is comprised of a support band 68 of closed peripheral construction similar to that of the FIG. 10 embodiment but which has formed therein a plurality of arcuate shaped, closed periphery openings 74 spaced circumferentially about support band 68'. When the spacer means 66' of FIG. 11 is interposed between the surface of a hot plate and the container bottom reposing thereon in the manner illustrated in FIGS. 2, 4 and 6, a plurality of air spaces S' are thus sealed between the container bottom and the surface of the hot plate, in addition to the central sealed space S. One sealed space S' is provided by each opening 74. Thus, the embodiment illustrated in FIGS. 11 and 11A provides a total of eight such sealed openings consisting of the large, central opening S and seven arcuate-shaped closed peripheral cut-outs or openings S'. The embodiment of FIGS. 11 and 11A also may have an adhesive layer and release liner (not shown).

Generally, the outer diameter D of gasket ring-type embodiments such as those illustrated in FIGS. 10 and 11 may, like the O-ring embodiments described above, range from about 3 to 5 inches (about 7.6 to 12.7 cm). The inside diameter D' of the gasket ring-type embodiments of FIGS. 10 and 11 may range from about 2½ to 4½ inches (about 6.4 to 11.5 cm) in diameter, with the width W of the support band ranging from about ¼ to about ½ inch (about 6.4 to 1.3 cm). As indicated above, the thickness d of the spacer means 64, 64' of FIGS. 10 and 11 may be as described above, that is, from about 1/32nd to about ⅛th of an inch (about 0.8 to 3.2 mm). The thickness of spacer means 66' is indicated by the dimension d in FIG. 11A. The dimensions D, D' and W are illustrated with respect to FIG. 10 only, the corresponding dimensions of FIG. 11 being apparent.

It will also be apparent that shapes other than a ring shape may be utilized to provide the closed peripheral configuration of the spacer means of the present invention. For example, a polygonal-shaped arrangement may be utilized, such as a triangular, rectangular, pentagonal or other configuration, so that the annular support band comprises a polygonal-shaped border surrounding the central opening. Alternatively, the annular support band need not be of uniform width but may have a plurality of lobes projecting therefrom. In any of these cases, the central opening will provide an enclosed space S of the type described above with respect to the embodiments of FIGS. 10 and 11 and the annular support band may be apertured to provide a plurality of smaller enclosed spaces similar to spaces S' illustrated in the embodiment of FIG. 11. Generally, the temperature attenuator may be configured as desired to fit a particular model of a hot plate and/or of a container bottom.

Example 3

A spacer means comprising a ring-gasket of the type illustrated in FIG. 10 was made of HT-1240 silicone rubber supplied by Bisco Products of Elk Grove, Ill., and had the following dimensions, as illustrated in FIGS. 10 and 10A: D = 4 5/16 inch (10.95 cm); D' = 3 5/16 inch; (8.41 cm); W = ½ inch (1.27 m); d = 1/32nd inch (0.8 mm); and d' = 1/22nd inch (1.2 mm). The ring was secured by means of its adhesive layer, concentrically to a heating plate manufactured by Bloomfield Industries of Chicago, Ill. The heating plate was fitted with an electric heating element, Model B-097A, disc, rated at 100 Watts and 120 Volts. The plate and its associated heating element form part of a Bunn-O-Matic 2 coffee maker which is equipped with a Wilbur Curtis glass carafe.

Twenty-two (22) separate tests were conducted, ten cups of coffee being freshly brewed for each test. Two cups of the brewed coffee were poured from the carafe periodically during each test to simulate actual conditions of use, the carafe being promptly replaced, after each pouring, on the ring gasket temperature attenuator fixed to the hot plate. Amounts ranged from ten cups to two cups for an average of six cups of coffee during each test and the average heating plate surface temperature was 364° F., as measured by a Taylor surface temperature thermometer. The average measured temperature of the coffee for the twenty-two tests was as follows:

| Average Temp. at Brewing | |
|---|---|
| after 10 min. | 184° F. |
| after 20 min. | 177° F. |
| after 30 min. | 175° F. |
| after 40 min. | 174° F. |
| after 50 min. | 173° F. |
| after 60 min. | 172° F. |
| after 120 min. | 172° F. |

After a minimum of two hours of testing, the temperature of the coffee was a constant 172° F. The temperature of the coffee was measured using a Taylor liquid thermometer. A Universal Enterprises coffee thermometer supplied by the LaTouraine Company was used simutaneously with the Taylor thermometer for all coffee temperature measurements and consistently showed a temperature of about 6° F. (3.33° C.) higher than those reported above.

Multiple taste tests were taken at each of the above test temperature levels, and the taste was deemed acceptable throughout the two hours of warming of the coffee.

While the invention has been described in detail with reference to specific embodiments thereof, it will be appreciated that upon a reading and understanding of the foregoing, variations to the described embodiments will occur to those skilled in the art. Such variations nonetheless believed to lie within the spirit and scope of the invention. For example, a simple elastic-strap harness may be utilized to secure the spacer means to the bottom of the container, without utilizing a thermal insulating cover. Alternatively, the spacer means could be incorporated within an elastic cuff-type structure which would extend only a short distance up from the bottom of the container while holding the spacer means in place adjacent the container bottom. In another variation, the thermal insulating cover of the embodiment illustrated in FIGS. 4 and 5 could have a longitudinally extending opening formed therein to permit visual observation of the liquid level within the container while still covering most of the surface area of the container to reduce radiant heat loss therefrom.

What is claimed is:

1. A temperature attenuator for a container having a container bottom which is dimensioned and configured to be seated upon a hot plate for heating the contents of the container, the temperature attenuator comprising:
   (a) a thermally insulating spacer means having a central opening defined by a continuous peripheral structure is dimensioned and configured to be interposed between the container bottom and the hot plate to thereby enclose an air space between the container bottom and the surface of the hot plate, whereby the support means, when in its interposed position, supports the container bottom in spaced, facing proximity to the hot plate; and
   (b) a retainer means secured to the spacer means and dimensioned and configured to retain the spacer means in its interposed position.

2. The temperature attenuator of claim 1 wherein the spacer means is dimensioned and configured to support the container bottom and the hot plate at a distance of from about 1/32nd to about ⅛th of an inch above the surface of the hot plate.

3. The temperature attenuator of claim 1 wherein the spacer means is of annular configuration.

4. The temperature attenuator of any one of claims 1, 2 or 3 wherein the spacer means comprises a gasket ring made of a heat-resistant, synthetic polymeric material.

5. The temperature attenuator of any one of claims 1, 2, or 3 wherein the spacer means comprises an O-ring made of a heat-resistant, synthetic polymeric material.

6. The temperature attenuator of any one of claims 1, 2 or 3 wherein the retainer means comprises a heat-resistant adhesive applied to the spacer means.

7. The temperature attenuator of claim 6 wherein the spacer means has a container side and a hot plate side and the retainer means is applied to one, but not both, of the container and hot plate sides.

8. The temperature attenuator of any one of claims 1, 2 or 3 wherein the retainer means comprises a harness carried by the container and connected to the spacer means, the harness being dimensioned and configured to secure the spacer means against the container bottom.

9. The temperature attenuator of claim 8 further including thermal insulating cover means carried on the harness to cover at least part of the container to thereby reduce radiant heat loss therefrom.

10. The temperature attenuator of any one of claims 1, 2 or 3 wherein the spacer means comprises an annular support band having a plurality of closed-periphery openings formed therein.

11. A temperature attenuator for a container having a container bottom which is dimensioned and configured to be seated upon a hot plate for heating the contents of the container, comprises a thermally insulating spacer means comprising a support band of closed peripheral configuration having one or more closed periphery openings formed therein, the spacer means being dimensioned and configured to be interposed between the container bottom and the hot plate to enclose a plurality of air spaces between the container bottom and the surface of the hot plate, whereby the support means, when in its interposed position, supports the container bottom in spaced, facing proximity to the hot plate.

12. The temperature attenuator of claim 11 wherein the spacer means comprises a gasket ring made of a heat-resistant, synthetic polymeric material.

13. The temperature attenuator of claim 11 including a plurality of closed-periphery openings formed in the support band.

14. The temperature attenuator of claim 13 wherein the support band is of generally annular configuration and has a plurality of closed periphery openings disposed circumferentially thereabout.

15. The temperature attenuator of any one of claims 11, 12, 13, or 14 further including a retainer means attached thereto.

16. The temperature attenuator of claim 15 wherein the retainer means is an adhesive applied to one side of the support band.

17. The temperature attenuator of claim 15 wherein the retainer means comprises a harness dimensioned and configured to be carried by a container and connected to the spacer means, the harness being dimensioned and configured to secure the spacer means against the bottom of a container.

18. The temperature attenuator of claim 15 further including thermal insulating cover means carried on the harness to cover at least part of the container to thereby reduce radiant heat loss therefrom.

19. A method of heating beverage contents of a container having a container bottom dimensioned and configured to be seated upon a hot plate having a heating surface, the method comprising the steps of:
   (a) supporting the container with its container bottom in close facing proximity to the heating surface of the hot plate by interposing between the container bottom and the hot plate a thermally insulative spacer means having a central opening defined by a continuous peripheral structure to thereby enclose one or more air spaces between the container bottom and the heating surface of the hot plate; and
   (b) maintaining the hot plate at an elevated temperature to heat the beverage contents of the container.

20. The method of claim 19 wherein the spacer means comprises a support band of closed peripheral configuration having one or more closed-periphery openings formed therein, and thereby including enclosing a plurality of air spaces between the container bottom and the surface of the hot plate.

21. The method of claim 19 or claim 20 wherein the contents of the container is coffee, and including maintaining the temperature of the hot plate at a temperature of from about 200° F. to about 450° F. (about 93° C. to 232° C.).

22. The method of claim 21 including maintaining the temperature of the hot plate at from about 300° F. to about 400° F. (about 149° C. to 204° C.).

23. The method of claim 21 including supporting the container bottom from about 1/32nd of an inch to about ⅛th of an inch (about 0.8 to 3.2 mm) from the heating surface of the hot plate.

* * * * *